United States Patent [19]

Schnell et al.

[11] Patent Number: 4,815,957

[45] Date of Patent: Mar. 28, 1989

[54] APPARATUS FOR CALIBRATING A TUBULAR FOIL BALLOON

[75] Inventors: Willi Schnell, Cologne; Klaus Steinberg, Troisdorf-Sieglar, both of Fed. Rep. of Germany

[73] Assignee: Reifenhauser GmbH & Co. Maschinenfabrik, Troisdorf, Fed. Rep. of Germany

[21] Appl. No.: 178,675

[22] Filed: Apr. 7, 1988

[30] Foreign Application Priority Data

May 9, 1987 [DE] Fed. Rep. of Germany ... 8706688[U]

[51] Int. Cl.$^4$ ............................................. B29C 47/92
[52] U.S. Cl. .................................. 425/140; 264/40.1; 264/209.4; 264/563; 425/72.1
[58] Field of Search ...................... 425/72.1, 140, 169, 425/171, 172, 326.1, 387.1; 264/40.1, 209.4, 563–566

[56] References Cited

U.S. PATENT DOCUMENTS

| | | | |
|---|---|---|---|
| 3,930,781 | 1/1976 | Upmeier | 425/326.1 |
| 3,980,418 | 9/1976 | Schott, Jr. | 425/326.1 X |
| 4,408,970 | 10/1983 | Bustin et al. | 425/72.1 |
| 4,473,527 | 9/1984 | Fujisaki et al. | 264/566 |

FOREIGN PATENT DOCUMENTS 3117806 5/1984 Fed. Rep. of Germany .

OTHER PUBLICATIONS

Page 334 of "Meyers enzyklopädisches Lexikon 1972, Band 4" (Meyers Encyclopedic Dictionary, vol. 4, p. 334–1972).

*Primary Examiner*—Richard L. Chiesa
*Attorney, Agent, or Firm*—Herbert Dubno

[57] ABSTRACT

The apparatus for calibrating a tubular foil bag comprises at least two iris aperture calibrating devices and at least one segment calibrating device. The iris aperture calibrating devices are spaced from each other and each have a plurality of iris aperture leaves, e.g. sickle shape leaves, which are movable and adjustable with a positioning ring which is mounted in an iris aperture housing. The segment calibrating device has a plurality of curved segments which make up a polygonal structure, which are connected to a plurality of supporting or carrying members and which are adjustable with the aid of an adjusting lever system. The segment calibrating device is positioned between two adjacent iris aperture calibrating devices and the supporting or carrying members are attached to at least one of the iris aperture housings for the iris aperture devices. So that the iris aperture device can control the operation of the segment calibrating device as well as calibrate the adjusting lever system for the segment calibrating device is couplable to the iris aperture leaves and is operable by the iris aperture leaves.

9 Claims, 3 Drawing Sheets

APPARATUS FOR CALIBRATING A TUBULAR FOIL BALLOON

FIELD OF THE INVENTION

Our present invention relates to a calibrating device used in the sizing of a tubular foil bubble or balloon in the blowing of a foil and, more particularly, to an apparatus for calibrating a balloon made from a thermoplastic foil during its manufacture by foil blowing.

BACKGROUND OF THE INVENTION

An apparatus for calibrating or sizing a tubular foil balloon in the blowing of a thermoplastic foil can comprise a pair of iris-type aperture calibrating devices or a segment-type calibrating device.

The iris aperture calibrating devices are spaced from each other and each have a plurality of iris aperture leaves which are movable and adjustable by a positioning ring which is mounted in an iris aperture housing.

The segment calibrating device has a plurality of curved segments which make up a polygonal structure, which are connected to a plurality of supporting or carrying members and which are adjustable with the aid of an adjusting lever system.

The iris aperture leaves are generally sickle or crescent shaped. The iris aperture calibrating devices are commercial calibrating devices which operate according to the iris aperture principle (see for example *Meyers Encyclopedia Dictionary*, Volume 4, Page 334 (1972)—*Meyers enzyklopadisches Lexikon* 1972, Band 4, Seite 334).

The edges of the iris-type aperture leaves, which are usually sickle shaped, together make up a curve which approximates a circle. The approximation is all the more exact the greater the number of iris-type aperture leaves and also depends on the aperture opening. The aperture opening of the iris-type aperture calibrating devices can be adjusted by hand or by an adjusting motor.

These known calibrating apparatuses are provided independently of one another. They have different design purposes, and, depending on need, one can use either the iris-type aperture calibrating device or the segment-type calibrating device.

Thus, according to the plastic material of the foil it has been necessary heretofore to provide either an iris-type aperture calibrating device or a segment-type calibrating device.

In a conventional manufacturing unit for tubular balloons the segment-type calibrating device is customarily located beneath the iris-type aperture calibrating devices. It operates with an adjusting lever system in which the components are constructed for their part like scissors levers. This adjusting level system is connected to a single drive (German Patent Document No. DE-OS 31 17 806).

OBJECTS OF THE INVENTION

It is an object of our invention to provide an apparatus for calibrating a tubular foil-blowing balloon which is free from drawbacks of the prior art systems.

It is also an object of our invention to provide an apparatus for calibrating a tubular foil-blowing balloon in which the structure and operation of the apparatus is simplified.

It is another object of our invention to provide an apparatus for calibrating a tubular foil-blowing balloon which is more versatile and can be used with a greater variety of thermoplastic materials.

SUMMARY OF THE INVENTION

These objects and others which will become more readily apparent hereinafter are attained in accordance with our invention in an apparatus for calibrating or sizing a tubular foil-blowing balloon used in a step in the manufacture of the foil-blowing balloon from a thermoplastic foil material comprising at least two iris-type aperture calibrating devices and a segment-type calibrating device.

The iris-type aperture calibrating devices are spaced from each other and each have a plurality of iris-type aperture leaves which are movable and adjustable with a positioning ring which is mounted in an iris-type aperture housing. The segment-type calibrating device has a plurality of curved segments which make up a polygonal structure connected to a plurality of supporting or carrying members and which are adjustable with the aid of an adjusting lever system.

According to our invention the segment-type calibrating device is positioned between two of the iris-type aperture calibrating or sizing devices. The supporting or carrying members are attached to at least one of the iris-type aperture housings for the iris-type aperture devices. Means is provided for selectively coupling the adjusting lever system is of the segment-type calibrator to the iris-type aperture leaves for operation of the segment-type calibrator by the iris-type aperture leaves.

Advantageously according to of our invention the adjustable lever system has a plurality of entrainment pins which engage against the front edge of the iris-type aperture leaves and are taken along by the iris-type aperture leaves during a reduction of the iris-type aperture opening. Advantageously also the adjusting lever system has at least one restoring or returning spring for the restoring or return motion of the lever systems and which is attached to the iris-type aperture housing.

In the apparatus according to our invention at least one of the iris-type aperture calibrating units has a double function. The first function is the known calibrating function specific to it. This remains and is maintained unchanged within the scope of our invention. The other function is that of a supporting device and adjusting or positioning drive for the segment-type calibrating device.

The construction of the invention is characterized by simplicity and reliability and provides the adjusting lever system with a plurality of pivotable levers, each attached by pivot links at one end to the individual curved segments and at the other end to an iris-type aperture housing. The pivotable levers are swingable about pivot axes or thogonal orthogonal to the iris-type leaf planes and adjacent curved segments are mounted on the individual pivotable levers so as to be able to cross over one another.

In the apparatus according to our invention, as has already been emphasized, the adjusting lever system are couplable to the iris-type aperture leaves. They are consequently disengageable when the segment-type calibrating device is to be taken out of operation. In the simplest case the already mentioned entrainment pins are engageable and disengageable, i.e. can be axially retracted from engagement with the respective iris leaf. The arc shape segments carry a plurality of rollers made of a plastic material, advantageously polytetrafluorethylene.

The calibrating apparatus according to our invention can be either fixed or adjustable in height, i.e. in regard to the spacing from the connected blow molding head of an appropriate extruder unit. Means can also provide a socalled X/Y adjustment in the calibration plane, i.e. one can position the axis of the calibration units as required with respect to the axis of the blowing head and/or the foil-blowing balloon.

In the scope of our invention the calibration apparatus can be rotated about its axis with or counter to the flowing head, e.g. by a mechanical connection to the appropriately driven blowing head, so that the iris-type aperture calibrating device and also the segment-type calibrating device also rotate. One can design the apparatus so that one or both of the iris-type calibrators can fulfill a calibrating function concurrently with that of the curved segments of the segment-type calibrating device.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
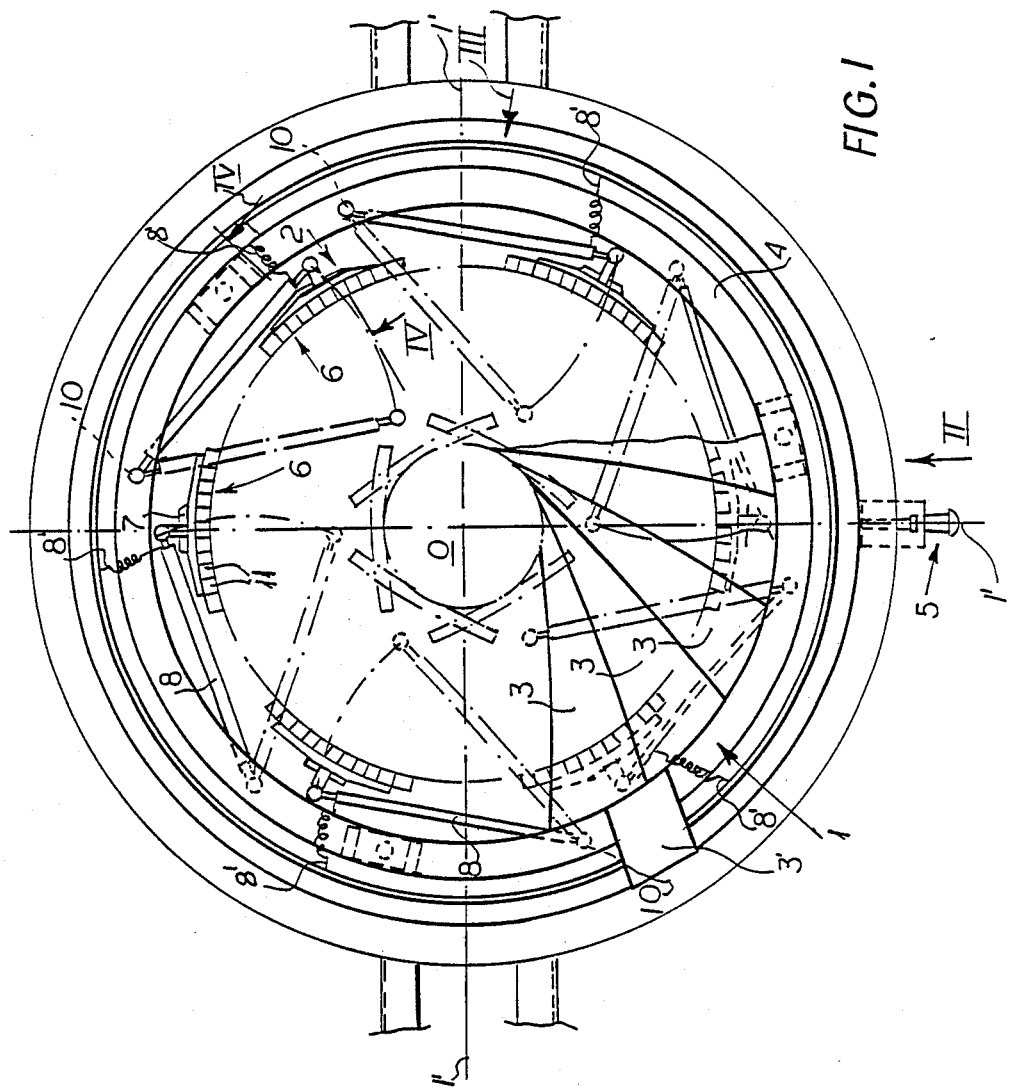
FIG. 1 is a partially broken away top plan view of a calibrating apparatus according to our invention.

The apparatus shown in the drawing is designed for sizing or calibrating a tubular foil-blowing balloon during a step in the manufacture of the balloon from a thermoplastic foil material.

This calibrating apparatus fundamentally comprises two iris-type aperture calibrating devices 1 and a segment-type calibrating device 2. Its structure is so designed that the iris-type aperture calibrating devices 1 are spaced from each other.

They comprise a plurality of iris-type aperture sickle-shaped leaves 3 which are movable and adjustable with a positioning ring 3'. The positioning ring 3' is only fragmentarily visible in FIGS. 1 and 2. It is adjustable with a positioning lever 5 and it is mounted on the iris-type aperture housing 4.

Figure 2:
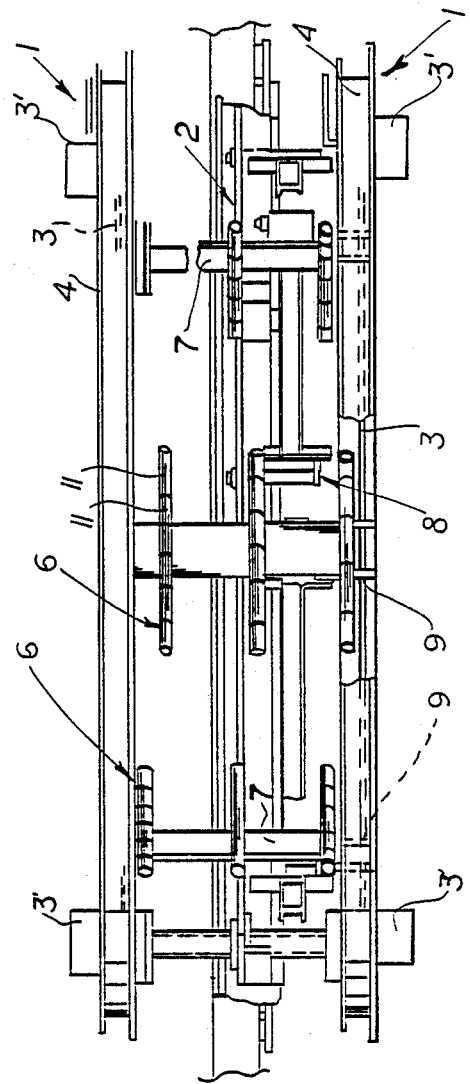
FIG. 2 is a side elevational view of the apparatus shown in FIG. 1 in the direction of the arrow II in FIG. 1.

The segment-type calibrating device 2 has for its part a plurality of curved segments 6 which make up a polygon-like structure. In FIG. 2 two possible configurations of these curved segments 6, an outer and an inner configuration, are indicated (compare the solid and dot-dash line positions). The segment-type calibrating device 2 is connected to supporting or carrying members 7 and is adjustable with the aid of an adjusting lever system 8.

Figure 4:
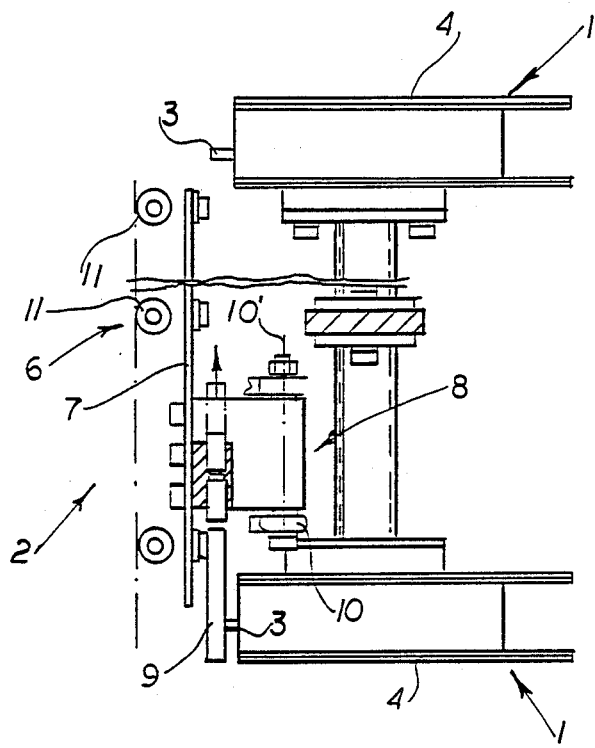
FIG. 4 is a cross sectional view of the apparatus shown in FIG. 1 taken along the section line IV—IV.

In particular it can be seen from FIGS. 2 and 4 that the segment-type calibrating device 2 is located between both iris-type aperture calibrating devices 1 whose iris-type aperture housings 4 carry the supporting or carrying members 7. The arrangement is designed so that the adjusting lever system 8 is coupled to the iris-type aperture leaves 3 and is operable by the iris-type aperture leaves 3.

From a comparison of FIGS. 1 and 4 it will be apparent that the adjusting lever system 8 has entrainment pins 9 which engage against the front edges of the iris-type aperture leaves 3 and are taken along by the iris-type aperture leaves 3 on reduction of the iris-type aperture opening.

Restoring springs 8' shown schematically in FIG. 1 effect the release when the iris-type aperture opening 0 is expanded. The inner pressure on the tubular foil-blowing balloon also contributes to the release in operation. The restoring springs 8' are connected at one end with the adjusting lever system 8 and at the other end with the iris-type aperture housing 4.

Figure 3:
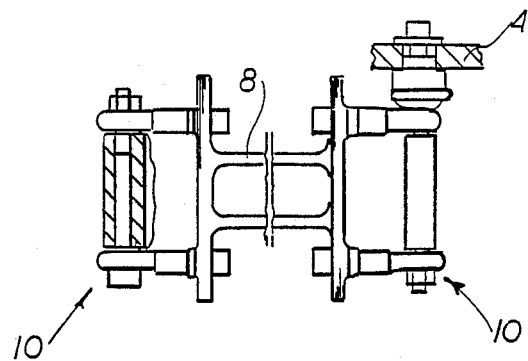
FIG. 3 is a side elevational view of a portion of the apparatus in the direction of the arrow III in FIG. 1 enlarged with respect to the scale of FIGS. 1 and 2.

The adjusting lever system 8 (FIGS. 1 and 3) comprises a plurality of pivotable levers 8 connected at one end with the individual curved segments 6 and at the other end with the iris-type aperture housing 4 by the pivotal links 10 which are pivotable about a pivot axis 10' perpendicular to the iris-type aperture axes 1'.

The adjacent curved segments 6 mounted on the individual pivotable levers 8 are arranged so as to be crossable in the direction of the curved segment 6 of the adjacent pivotable lever 8. That refers to the configuration of the curved segments which constitute the inner configuration in FIG. 1. The entrainment pins 9 are engageable and disengageable. They can be raised as indicated by an arrow in FIG. 4 to decouple from the leaves 3. The raised position of the entrainment pin 9 in FIG. 4 is shown with a dot-dashed line. The curved segments 6 carry rollers 11 made of a plastic material, e.g. of polytetrafluorethylene.

We claim:

1. In an apparatus for calibrating a tubular foil-blowing balloon used in a step in the manufacture of said tubular foil-blowing balloon from a thermoplastic foil material comprising at least two iris-type aperture calibrating devices and at least one segment-type calibrating device, said iris-type aperture calibrating devices being spaced from each other and each having a plurality of iris-type aperture leaves which are movable and adjustable with a positioning ring which is mounted in an iris-type aperture housing and said segment-type calibrating device having a plurality of curved segments which make up a polygonal structure connected to a supporting member and which are adjustable with the aid of an adjusting lever system, the improvement wherein:

said segment-type calibrating device is positioned between two of said iris-type aperture calibrating devices, said supporting member is attached to one of said iris-type aperture housing; and means is provided for selectively coupling said adjusting lever system to the iris-type aperture leaves of at least one of said iris-type aperture devices and is operable by said iris-type aperture leaves thereof.

2. The improvement defined in claim 1 wherein said adjusting lever system has a plurality of entrainment pins which engage against the front edges of said iris-type aperture leaves of at least one of said iris-type aperture calibrating devices and are taken along by said iris-type aperture leaves on reduction of the opening of said iris-type aperture devices and said adjusting lever system has at least one restoring spring for the restoring motion which is connected with said iris-type aperture housing.

3. The improvement defined in claim 2 wherein said entrainment pins are selectively engageable and disengageable.

4. The improvement defined in claim 1 wherein said adjusting lever system comprises a plurality of pivotable levers each connected at one end with said curved segments and at the other end with at least one of said iris-type aperture housings by a plurality of pivot links which are pivotable on pivot axes perpendicular to the iris-type aperture axes of said iris-type aperture devices and adjacent ones of said curved segments mounted on adjacent individual ones of said pivotable levers are crossable.

5. The improvement defined in claim 4 wherein said curved segments are provided with a plurality of rollers.

6. The improvement defined in claim 5 wherein said rollers are made of a plastic material.

7. The improvement defined in claim 6 wherein said plastic material is polytetrafluorethylene.

8. An apparatus for calibrating a tubular foil-blowing balloon used in a step in the manufacture of said tubular foil-blowing balloon from a thermoplastic foil material comprises:
two iris-type aperture calibrating devices spaced from each other and each having a plurality of iris-type aperture leaves which are movable and adjustable with a positioning ring which is mounted in an iris-type aperture housing;
a segment-type calibrating device including a plurality of curved segments which make up a polygonal structure connected to a plurality of supporting or carrying members and which are adjustable with the aid of an adjusting lever system, said segment-type calibrating device being positioned between said iris-type aperture calibrating devices, said supporting or carrying members being attached to at least one of said iris-type aperture housings for said iris-type aperture devices and said adjusting lever system having a plurality of engageable and disengageable entrainment pins which engage against the front edges of said iris-type aperture leaves of at least one of said iris-type aperture calibrating devices and which are taken along by said iris-type aperture leaves on reduction of the opening of said iris-type aperture devices and said adjusting lever system has at least one restoring spring for the restoring motion which is connected with said iris-type aperture housing.

9. The apparatus defined in claim 8 wherein said adjusting lever system comprises a plurality of pivotable levers each connected at one end with an individual one of said curved segments and at the other end with said iris-type aperture housing by a plurality of pivot links which are pivotable on pivot axes perpendicular to the iris-type aperture axes of said iris-type aperture calibrating devices and adjacent ones of said curved segments mounted on said pivotable levers are crossable.

* * * * *